United States Patent
Liu

(10) Patent No.: US 6,641,228 B2
(45) Date of Patent: Nov. 4, 2003

(54) DETACHABLE FRONT WHEEL STRUCTURE OF GOLF CART

(76) Inventor: Chong-Yong Liu, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/058,479

(22) Filed: Jan. 25, 2002

(65) Prior Publication Data

US 2003/0141756 A1 Jul. 31, 2003

(51) Int. Cl.[7] .................. B60B 27/00; B60B 31/00; B62B 1/00; B62B 7/00; B62B 9/00
(52) U.S. Cl. .................. 301/111.06; 301/111.01; 16/31 A; 280/DIG. 6; 280/654
(58) Field of Search .................. 301/111.01, 111.061; 16/31 A, 31 R; 280/DIG. 6, 647, 648, 651, 654

(56) References Cited

U.S. PATENT DOCUMENTS

| 4,978,175 A | * | 12/1990 | Wu .................. 301/121 |
| 5,507,566 A | * | 4/1996 | Chen .................. 301/111.06 |
| 6,152,540 A | * | 11/2000 | Lin .................. 301/111.06 |
| RE37,390 E | * | 9/2001 | Liao et al. .................. 301/111.06 |

* cited by examiner

*Primary Examiner*—S. Joseph Morano
*Assistant Examiner*—Jason R. Bellinger

(57) ABSTRACT

A detachable front wheel structure of a golf cart includes a main frame having a lower portion provided with a front wheel frame, and a quick release device mounted between the main frame and the front wheel frame. The quick release device includes a connecting rod, a mounting member, a spring, a push button, a rectangular sleeve, and an outer mounting seat. Thus, the front wheel frame may be mounted on and detached from the main frame easily and rapidly by action of the quick release device.

8 Claims, 11 Drawing Sheets

DETACHABLE FRONT WHEEL STRUCTURE OF GOLF CART

BACKGROUND OF THE INVENTION

1. Field of the Invention

The present invention relates to a detachable front wheel structure of a golf cart, and more particularly to a detachable front wheel structure of a golf cart, wherein the front wheel frame may be mounted on and detached from the main frame easily and rapidly by action of the quick release device.

2. Description of the Related Art

A conventional two-wheel type golf cart 5 in accordance with the prior art shown in FIG. 8 comprises a main rod having a mediate portion provided with an upper support base 51 and a lower end provided with a bottom support base 52. Each of the upper support base 51 and the bottom support base 52 is provided with a snap strap 53 for securing the golf bag and club set. The main rod is provided with a wheel frame 54 which is provided with two wheels 55.

A conventional three-wheel type golf cart 6 in accordance with the prior art shown in FIG. 9 comprises a main rod having a mediate portion provided with a wheel frame which is provided with two rear wheels 62, and a lower end provided with a front wheel 61.

As shown in FIGS. 10 and 11, the conventional golf cart 6 in accordance with the prior art may be made foldable, and comprises a main frame 67, a front wheel frame 68 mounted on the lower portion of the main frame 67, a secondary frame 66 pivotally mounted on the upper portion of the main frame 67, and a handle 65 mounted on the secondary frame 66. The handle 65 may be folded into the secondary frame 66 by a retraction fixing structure 69. The main frame 67 and the secondary frame 66 may be folded by a folding mechanism 64. The main frame 67 and the front wheel frame 68 may be folded by a folding mechanism 63.

As shown in FIG. 11, the conventional golf cart 6 in accordance with the prior art has been folded. However, the front wheels 61 mounted on the front wheel frame 68, the main frame 67 and the secondary frame 66 will interfere with each other, so that the conventional golf cart 6 cannot be folded entirely.

SUMMARY OF THE INVENTION

The present invention has arisen to mitigate and/or obviate the disadvantage of the conventional golf cart.

The primary objective of the present invention is to provide a detachable front wheel structure of a golf cart, wherein the front wheel frame may be mounted on and detached from the main frame easily and rapidly by action of the quick release device.

Another objective of the present invention is to provide a detachable front wheel structure of a golf cart, wherein the front wheel frame may be detached from the main frame rapidly and conveniently, whereby the front wheel frame and the front wheel will not interfere with the folding action of the golf cart, so that the golf cart may be folded entirely.

A further objective of the present invention is to provide a detachable front wheel structure of a golf cart, wherein the front wheel frame may be mounted on the main frame rapidly and conveniently, thereby facilitating the user using the golf cart.

In accordance with the present invention, there is provided a detachable front wheel structure of a golf cart, comprising a main frame having a lower portion provided with a front wheel frame, and a quick release device mounted between the main frame and the front wheel frame, the quick release device includes a connecting rod, a mounting member, a spring, a push button, a rectangular sleeve, and an outer mounting seat, wherein:

the connecting rod is mounted on a top edge of the front wheel frame, and is formed with a hollow receiving chamber, the connecting rod has a surface formed with a circular hole communicated with the receiving chamber;

the mounting member is mounted in the receiving chamber of the connecting rod, and has a central surface formed with a push button recess aligned with the circular hole of the connecting rod;

the spring is mounted in the push button recess of the mounting member;

the push button is mounted in the push button recess of the mounting member, and may be protruded outward from the circular hole of the connecting rod, the push button has a bottom provided with an annular flange received in the circular hole of the connecting rod;

the rectangular sleeve is mounted on the connecting rod, and has a surface formed with a circular hole aligned with the circular hole of the connecting rod; and the outer mounting seat is mounted on the rectangular sleeve, and is formed with a passage for receiving the rectangular sleeve, the outer mounting seat has a top surface formed with a circular hole aligned with the circular hole of the rectangular sleeve, and a through hole located beside the circular hole, the passage of the outer mounting seat has a first opened end having a top edge protruded with a guide wing and a bottom edge formed with a depression which is formed with a through hole, the passage of the outer mounting seat has a second opened end provided with an extension wing which is formed with a through hole.

Further benefits and advantages of the present invention will become apparent after a careful reading of the detailed description with appropriate reference to the accompanying drawings.

DETAILED DESCRIPTION OF THE INVENTION

Figure 1:
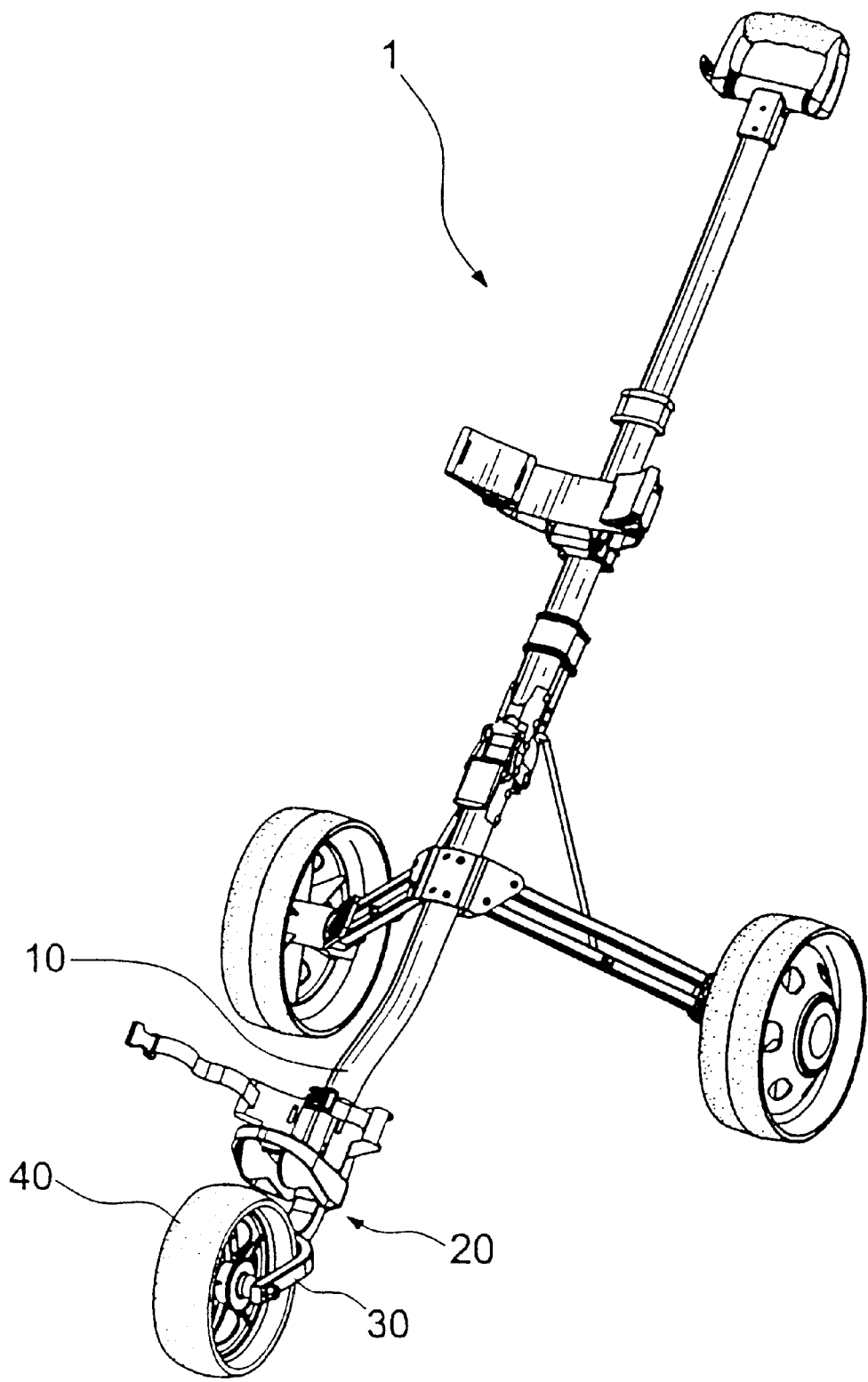
FIG. 1 is a perspective view of a detachable front wheel structure of a golf cart in accordance with a preferred embodiment of the present invention.
Figure 2:
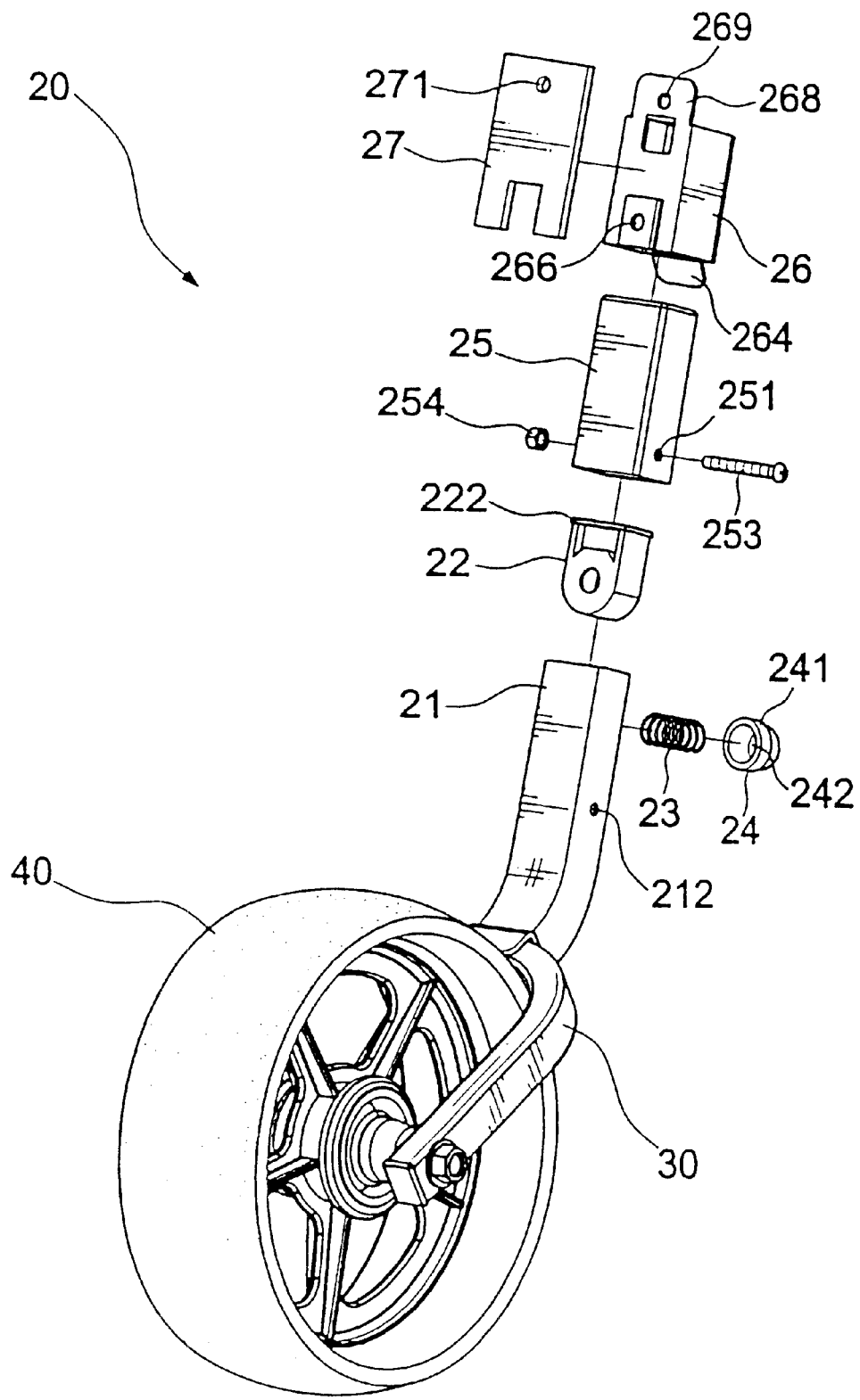
FIG. 2 is an exploded perspective view of a quick release device of a detachable front wheel structure of a golf cart in accordance with a preferred embodiment of the present invention.
Figure 3:
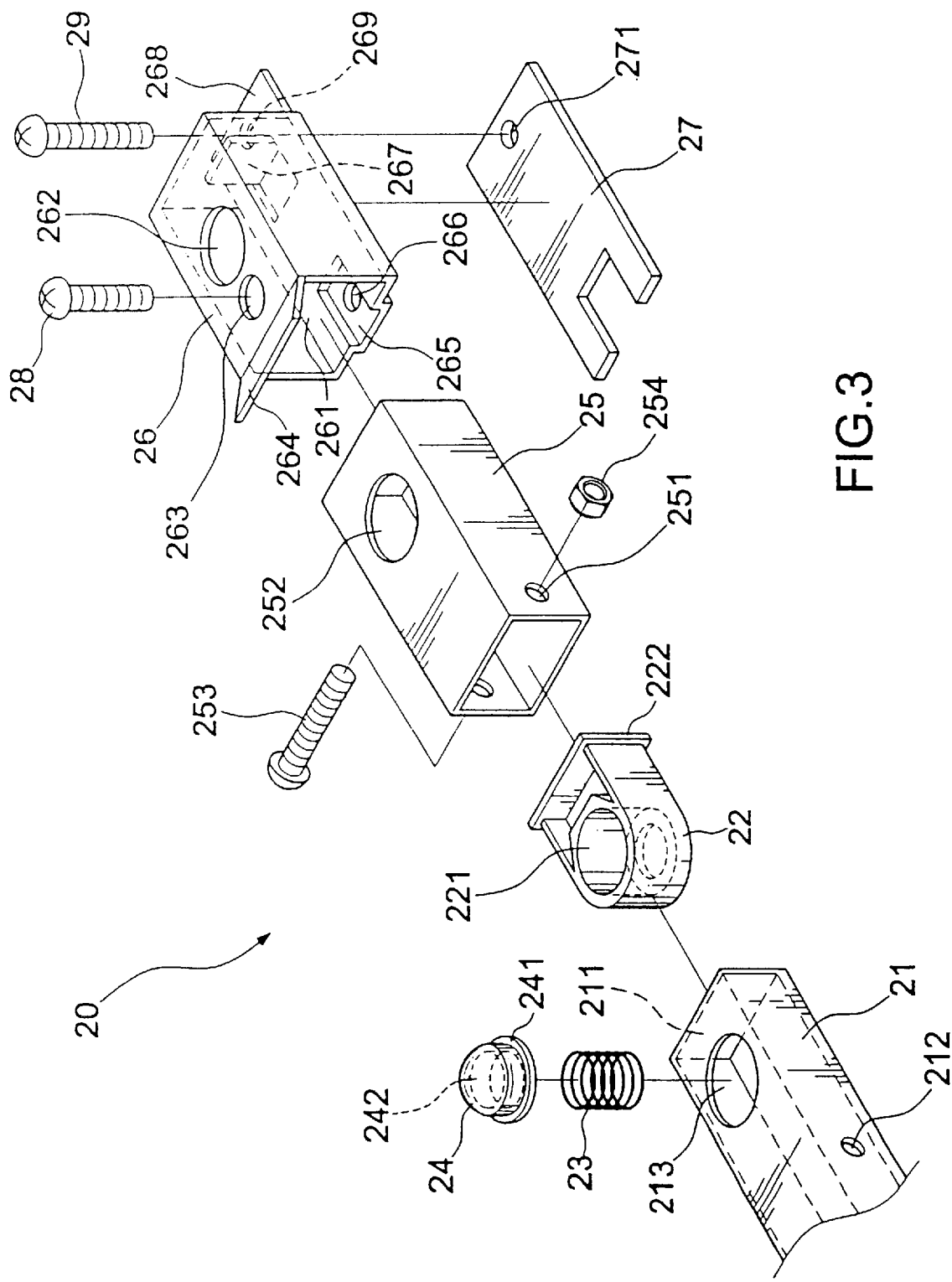
FIG. 3 is an exploded perspective view of a quick release device of a detachable front wheel structure of a golf cart in accordance with a preferred embodiment of present invention.

Referring to the drawings and initially to FIG. 1, a detachable front wheel structure of a golf cart 1 in accordance with a preferred embodiment of the present invention comprises a main frame 10 having a lower portion provided with a front wheel frame 30 which is provided with a front wheel 40, and a quick release device 20 mounted between the main frame 10 and the front wheel frame 30 for mounting the front wheel frame 30 on the main frame 10 and detaching the front wheel frame 30 from the main frame 10 easily and rapidly.

Referring to FIGS. 2–5, the quick release device 20 of detachable front wheel structure of a golf cart 1 in accordance with a preferred embodiment of the present invention includes a connecting rod 21, a mounting member 22, a spring 23, a push button 24, a rectangular sleeve 25, an outer mounting seat 26, and an inverted U-shaped pad 27.

The connecting rod 21 is mounted on a top edge of the front wheel frame 30, and is formed with a hollow receiving chamber 211. The connecting rod 21 has two side walls formed with two opposite through holes 212 communicated with the receiving chamber 211, and has a surface formed with a circular hole 213 communicated with the receiving chamber 211.

The mounting member 22 is mounted in the receiving chamber 211 of the connecting rod 21, and has a central surface formed with a push button recess 221 aligned with the circular hole 213 of the connecting rod 21. The push button recess 221 of the mounting member 22 has a diameter the same as that of the circular hole 213 of the connecting rod 21. The mounting member 22 has a distal end provided with a resting end face 222.

The spring 23 is mounted in the push button recess 221 of the mounting member 22.

The push button 24 is mounted in the push button recess 221 of the mounting member 22, and may be protruded outward from the circular hole 213 of the connecting rod 21. The push button 24 is formed with a circular recess 242 for receiving the spring 23, and has a bottom provided with an annular flange 241 received in the circular hole 213 of the connecting rod 21.

The rectangular sleeve 25 is mounted on the connecting rod 21, and has a surface formed with a circular hole 252 aligned with the circular hole 213 of the connecting rod 21. The circular hole 252 of the rectangular sleeve 25 has a diameter smaller than that of the circular hole 213 of the connecting rod 21. The rectangular sleeve 25 has two side walls formed with two opposite through holes 251 aligned with the two opposite through holes 212 of the connecting rod 21.

The outer mounting seat 26 is mounted on the rectangular sleeve 25, and is formed with a passage 261 for receiving the rectangular sleeve 25. The outer mounting seat 26 has a top surface formed with a circular hole 262 aligned with the circular hole 252 of the rectangular sleeve 25, and a through hole 263 located beside the circular hole 262. The passage 261 of the outer mounting seat 26 has a first opened end having a top edge protruded with a guide wing 264 and a bottom edge formed with a depression 265 which is formed with a through hole 266. The passage 261 of the outer mounting seat 26 has a second opened end provided with a catch block 267 and an extension wing 268. The extension wing 268 is formed with a through hole 269.

The inverted U-shaped pad 27 is mounted on a bottom surface of the outer mounting seat 26, and has a distal end formed with a through hole 271.

Figure 4:
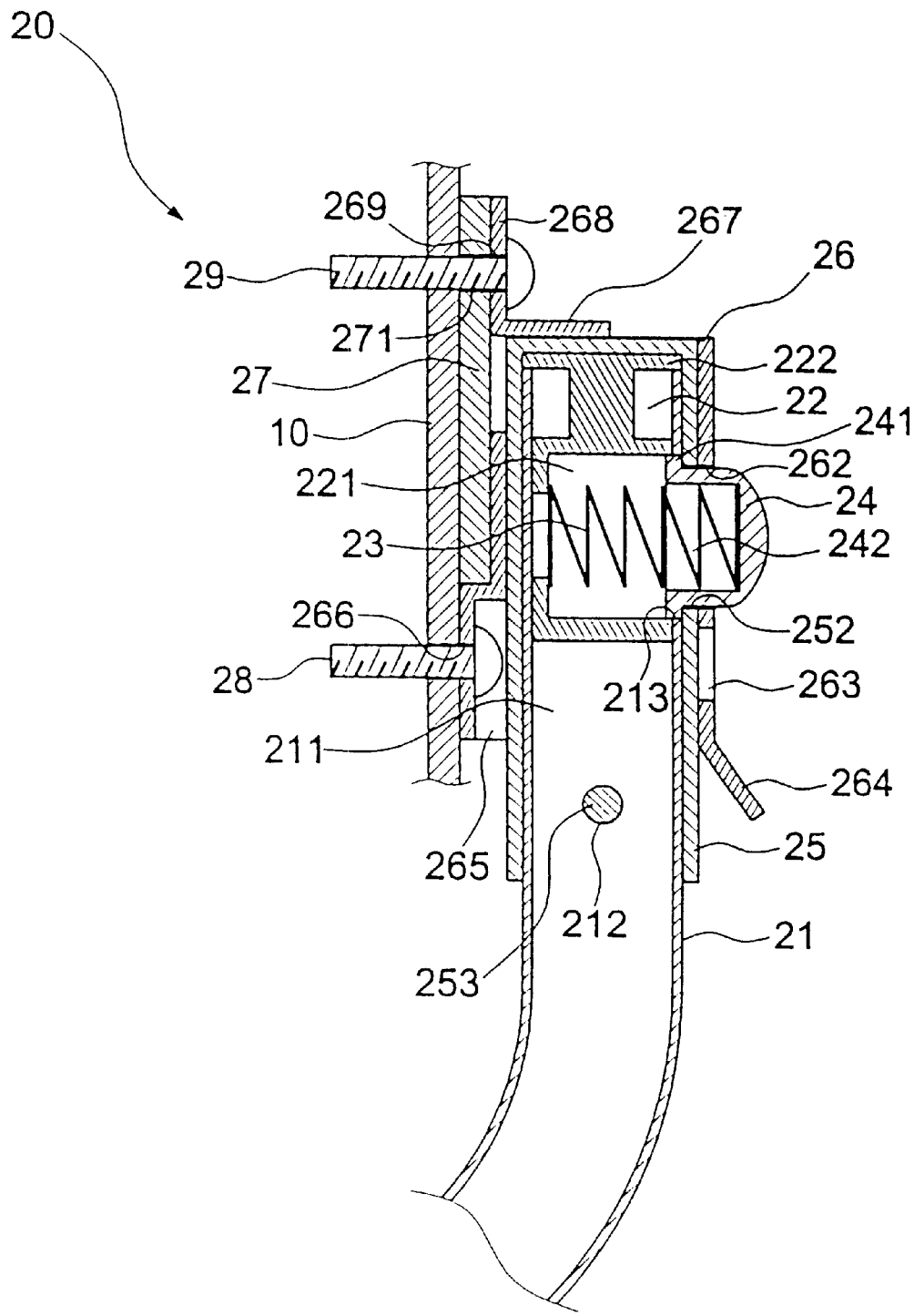
FIG. 4 is a side plan cross-sectional assembly view of the quick release device of the detachable front wheel structure of a golf cart as shown in FIG. 2.
Figure 5:
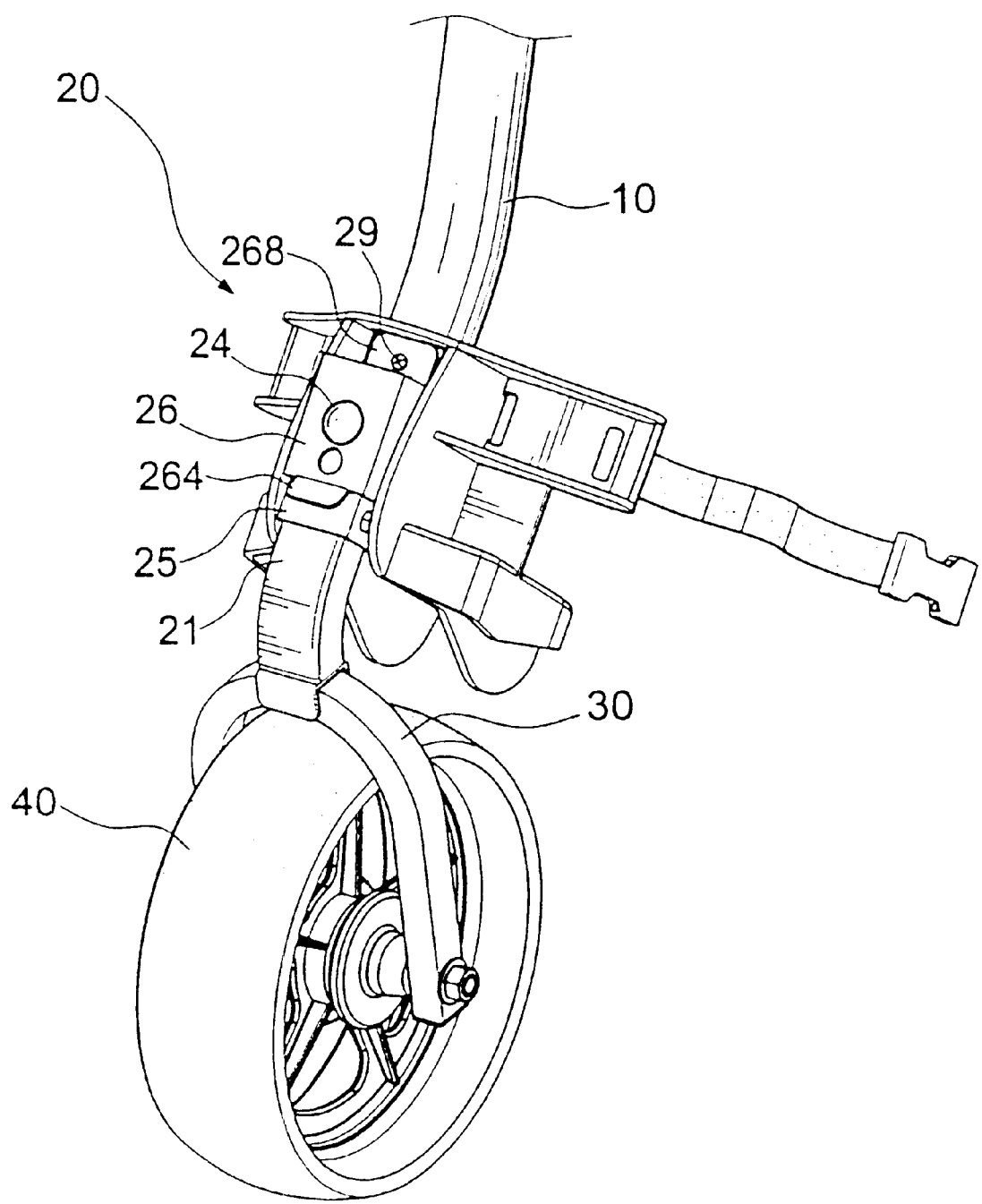
FIG. 5 is a perspective assembly view of the quick release device of the detachable front wheel structure of a golf cart as shown in FIG. 2.

In assembly, referring to FIGS. 4 and 5, the mounting member 22 is mounted in the receiving chamber 211 of the connecting rod 21, and the push button recess 221 of the mounting member 22 is aligned with the circular hole 213 of the connecting rod 21. Then, the spring 23 and the push button 24 are serially mounted in the push button recess 221 of the mounting member 22, and one end of the spring 23 is locked in the circular recess 242 of the push button 24. Then, the connecting rod 21 is forced into the rectangular sleeve 25, with the top of the push button 24 being protruded outward from the circular hole 252 of the rectangular sleeve 25, and with the flange 241 of the push button 24 being rested on the wall of the circular hole 252 of the rectangular sleeve 25, so that the push button 24 may be protruded outward from and retracted into the circular hole 252 of the rectangular sleeve 25, and will not detach from the circular hole 252 of the rectangular sleeve 25. A screw 253 is in turn extend through the through holes 251 and the through holes 212, and is screwed into a nut 254, thereby securing the connecting rod 21 on the rectangular sleeve 25.

Then, a screw 28 passing through the through hole 263 is extended through the through hole 266, and is screwed into the back face of the main frame 10, while a screw 29 is in turn extended through the through hole 269 and the through hole 271, and is screwed into the back face of the main frame 10, thereby locking the outer mounting seat 26 on the main frame 10. The inverted U-shaped pad 27 is mounted between the outer mounting seat 26 and the main frame 10, thereby filling the gap between the outer mounting seat 26 and the main frame 10.

Then, the rectangular sleeve 25 may be forced into the passage 261 of the outer mounting seat 26 by guidance of the guide wing 264 of the outer mounting seat 26, while the front end of the rectangular sleeve 25 is stopped by the catch block 267 of the outer mounting seat 26, and the push button 24 is protruded outward from the circular hole 262 of the outer mounting seat 26, thereby locking and securing the rectangular sleeve 25 in the passage 261 of the outer mounting seat 26.

Figure 6:
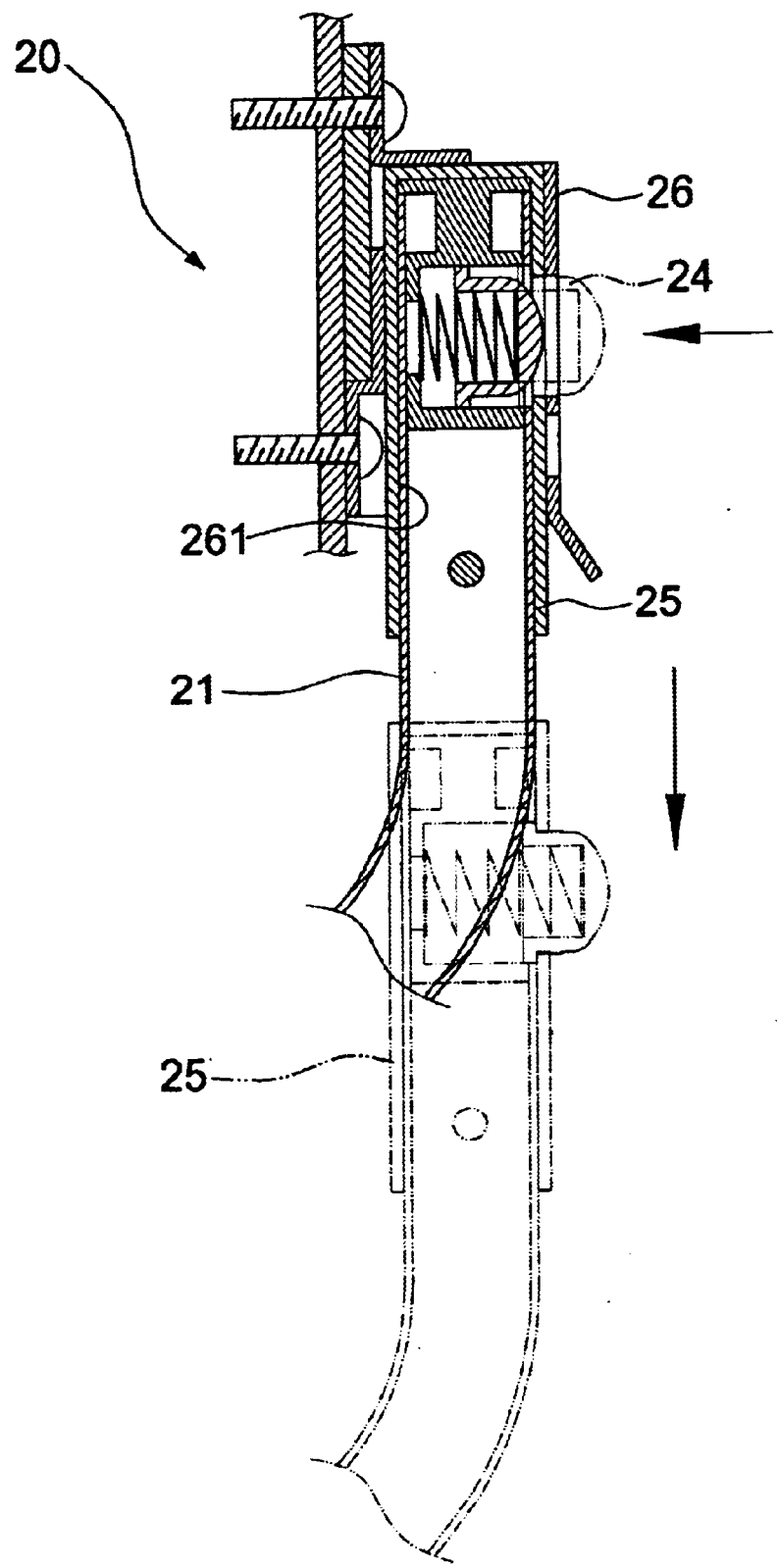
FIG. 6 is a schematic operational view of the detachable front wheel structure of a golf cart as shown in FIG. 4 in use.

In operation, referring to FIG. 6 with reference to FIGS. 1–5, the push button 24 may be pressed inward, to disengage the rectangular sleeve 25 from the passage 261 of the outer mounting seat 26, so that the rectangular sleeve 25 may be forced outward to detach from the outer mounting seat 26, thereby detaching the front wheel frame 30 from the main frame 10.

Figure 7:
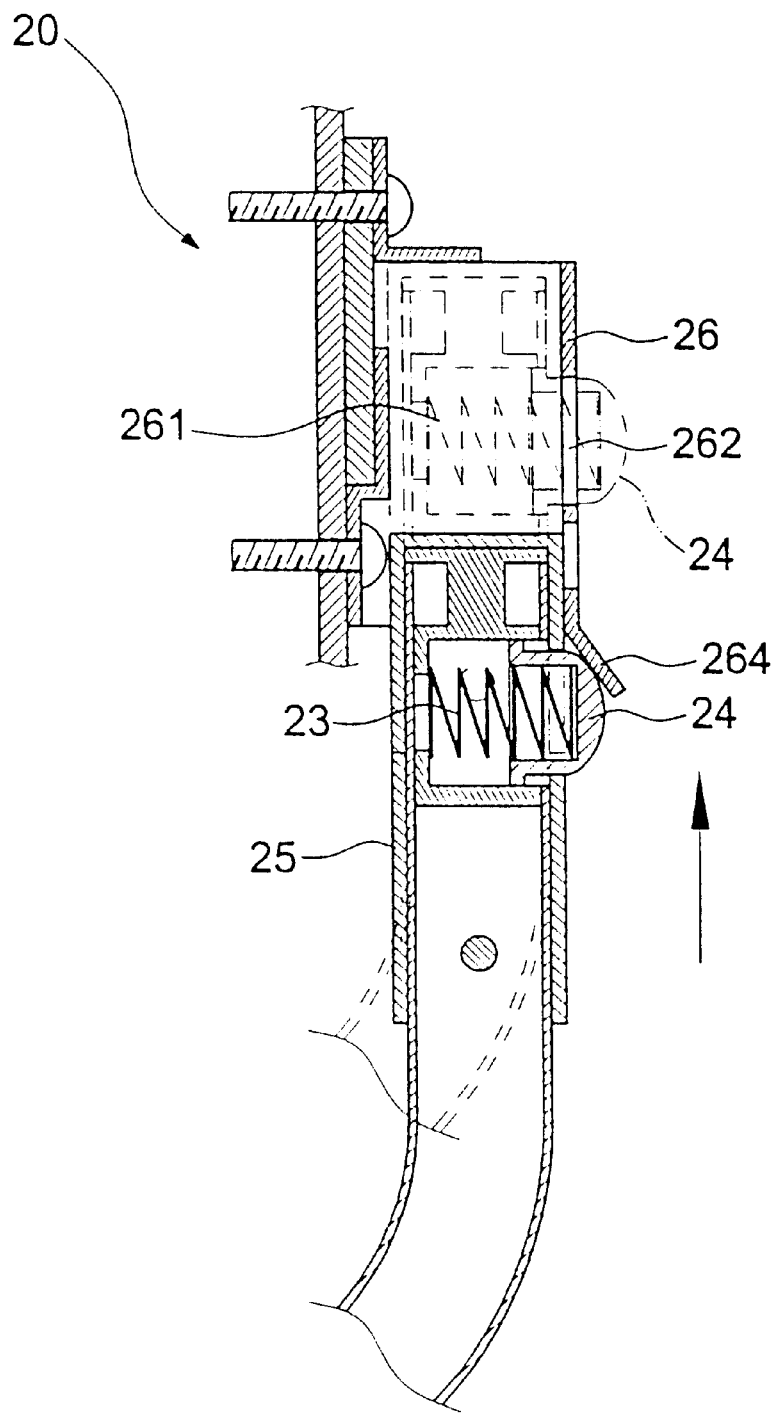
FIG. 7 is a schematic operational view of the detachable front wheel structure of a golf cart as shown in FIG. 4 in use.
Figure 8:
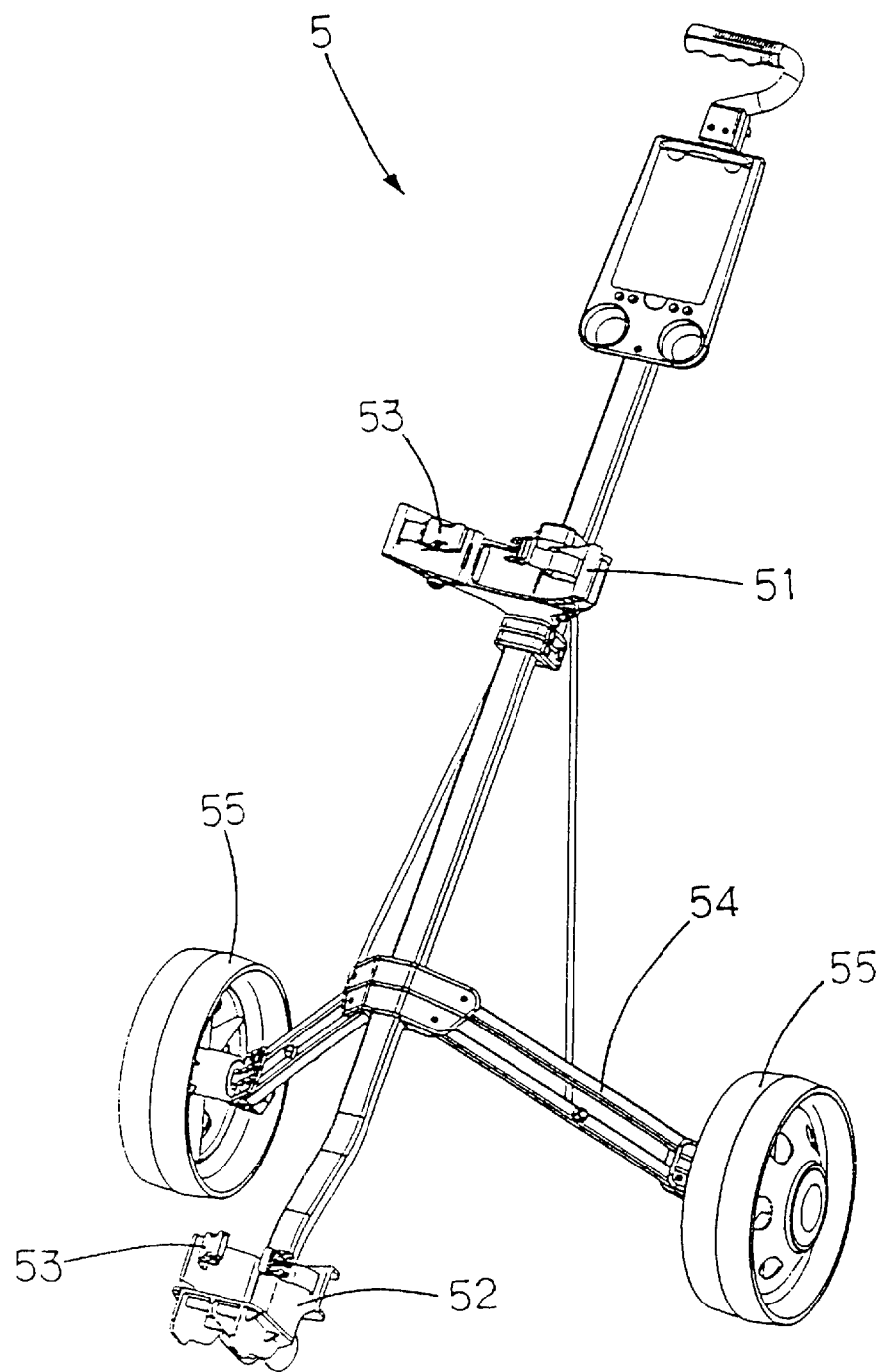
FIG. 8 is a perspective view of a conventional two-wheel type golf cart in accordance with the prior art.
Figure 9:
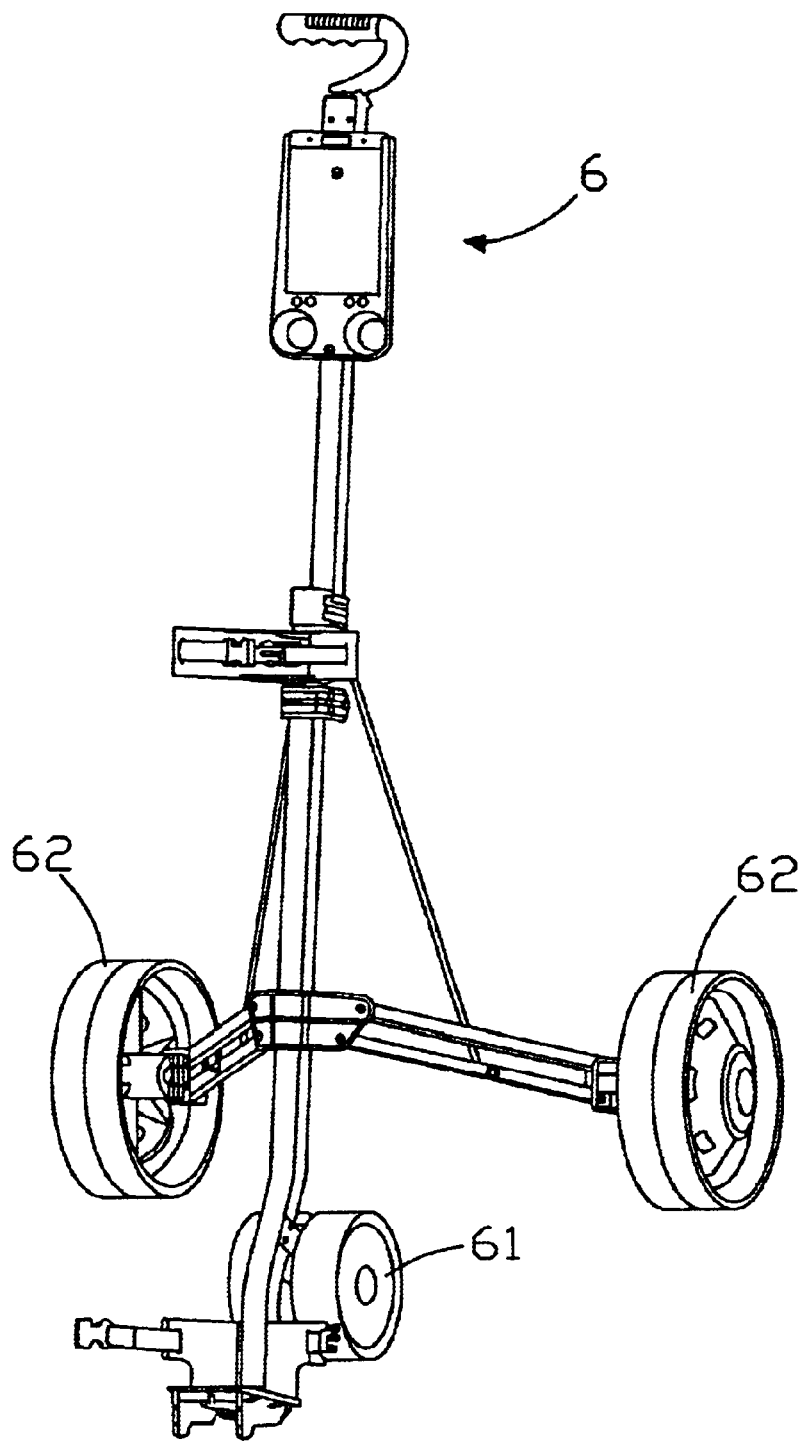
FIG. 9 is a perspective view of a conventional three-wheel type golf cart in accordance with the prior art.
Figure 10:
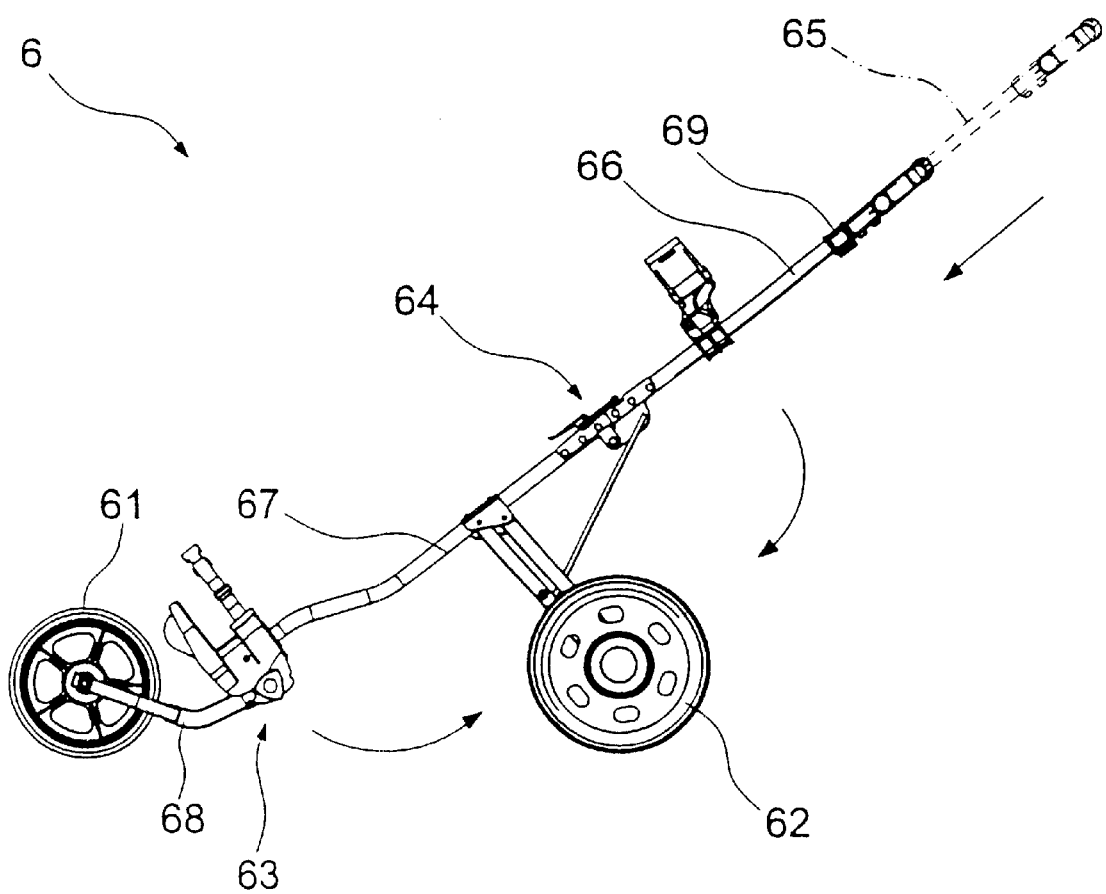
FIG. 10 is a side plan view of the conventional three-wheel type golf cart as shown in FIG. 9.
Figure 11:
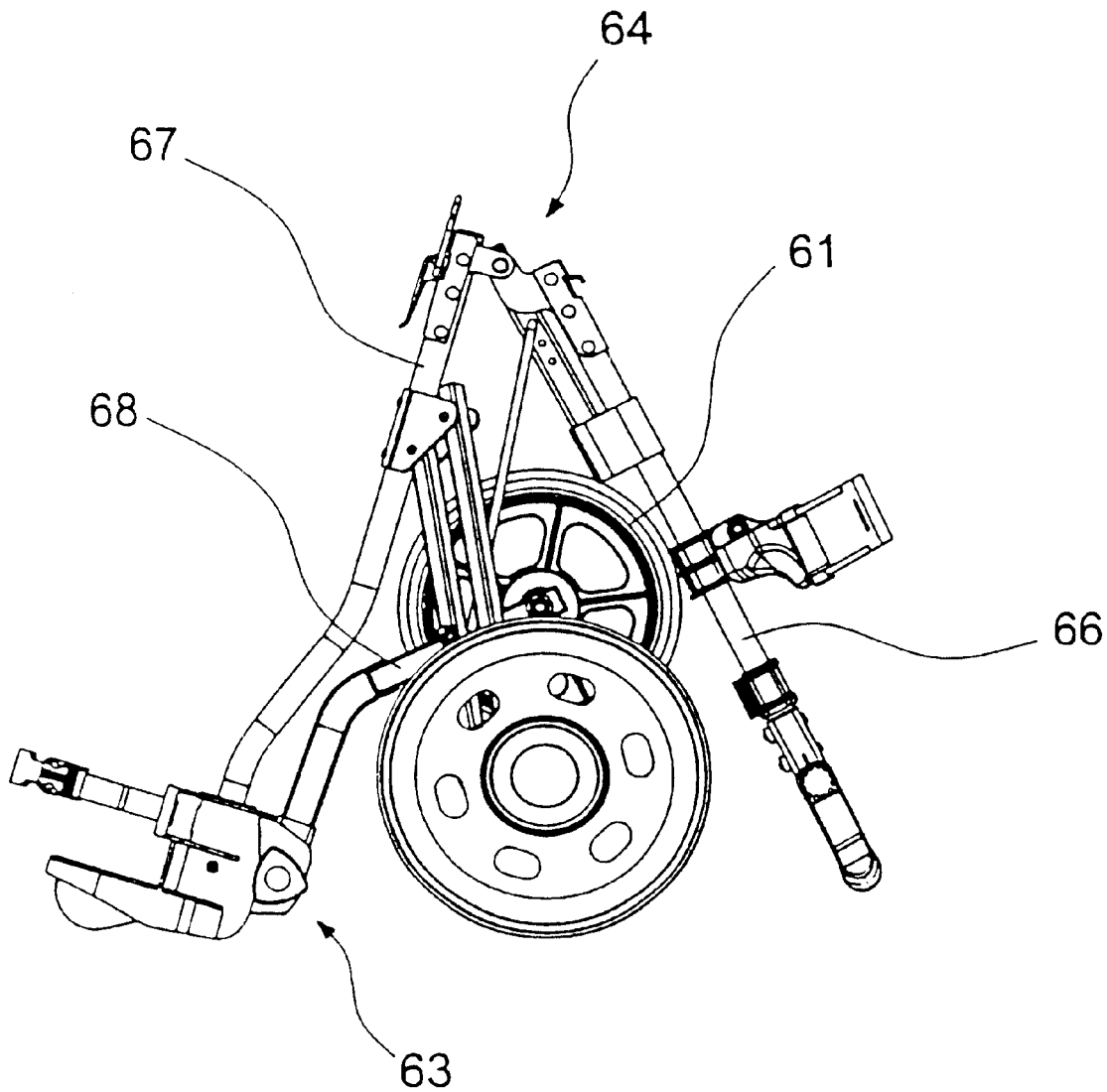
FIG. 11 is a folding view of the conventional three-wheel type golf cart as shown in FIG. 10.

Alternatively, referring to FIG. 7 with reference to FIGS. 1–5, the rectangular sleeve 25 may be forced into the passage 261 of the outer mounting seat 26 by guidance of the guide wing 264 of the outer mounting seat 26, until the push button 24 is aligned with the circular hole 262 of the outer mounting seat 26, so that the push button 24 may be protruded outward from the circular hole 262 of the outer mounting seat 26 by the restoring force of the spring 23, thereby locking and securing the rectangular sleeve 25 in the passage 261 of the outer mounting seat 26, so that the front wheel frame 30 may be secured to the main frame 10.

Accordingly, the front wheel frame 30 may be mounted on and detached from the main frame 10 easily and rapidly by action of the quick release device 20. In addition, the front wheel frame 30 may be detached from the main frame 10 rapidly and conveniently, whereby the front wheel frame 30 and the front wheel 40 will not interfere with the folding action of the golf cart 1, so that the golf cart 1 may be folded entirely. Further, the front wheel frame 30 may be mounted on the main frame 10 rapidly and conveniently, thereby facilitating the user using the golf cart 1.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A detachable front wheel structure of a golf cart, comprising a main frame having a lower portion provided with a front wheel frame, and a quick release device mounted between the main frame and the front wheel frame, the quick release device includes a connecting rod, a mounting member, a spring, a push button, a rectangular sleeve, and an outer mounting seat, wherein:

the connecting rod is mounted on a top edge of the front wheel frame, and is formed with a hollow receiving chamber, the connecting rod has a surface formed with a circular hole communicated with the receiving chamber;

the mounting member is mounted in the receiving chamber of the connecting rod, and has a central surface formed with a push button recess aligned with the circular hole of the connecting rod;

the spring is mounted in the push button recess of the mounting member;

the push button is mounted in the push button recess of the mounting member, and will protrude outwardly from the circular hole of the connecting rod when engaged in a locked position, the push button has a bottom provided with an annular flange received in the circular hole of the connecting rod; p1 the rectangular sleeve is mounted on the connecting rod, and has a surface formed with a circular hole aligned with the circular hole of the connecting rod; and the outer mounting seat is mounted on the rectangular sleeve, and is formed with a passage for receiving the rectangular sleeve, the outer mounting seat has a top surface formed with a circular hole aligned with the circular hole of the rectangular sleeve, and a through hole located beside the circular hole, the passage of the outer mounting seat has a first opened end having a top edge protruded with a guide wing and a bottom edge formed with a depression which is formed with a through hole, the passage of the outer mounting seat has a second opened end provided with an extension wing which is formed with a through hole.

2. The detachable front wheel structure of a golf cart in accordance with claim 1, wherein the connecting rod has two side walls formed with two opposite through holes communicated with the receiving chamber, and the rectangular sleeve has two side walls formed with two opposite through holes aligned with the two opposite through holes of the connecting rod.

3. The detachable front wheel structure of a golf cart in accordance with claim 1, wherein the push button recess of the mounting member has a diameter the same as that of the circular hole of the connecting rod.

4. The detachable front wheel structure of a golf cart in accordance with claim 1, wherein the mounting member has a distal end provided with a resting end face, and the second opened end of the passage of the outer mounting seat is provided with a catch block for stopping the resting end face of the mounting member.

5. The detachable front wheel structure of a golf cart in accordance with claim 1, wherein the push button is formed with a circular recess for receiving the spring.

6. The detachable front wheel structure of a golf cart in accordance with claim 1, wherein the circular hole of the rectangular sleeve has a diameter smaller than that of the circular hole of the connecting rod.

7. The detachable front wheel structure of a golf cart in accordance with claim 1, further comprising an inverted U-shaped pad mounted on a bottom surface of the outer mounting seat.

8. The detachable front wheel structure of a golf cart in accordance with claim 7, wherein the inverted U-shaped pad has a distal end formed with a through hole.

* * * * *